United States Patent
Engleman

[15] 3,696,592
[45] Oct. 10, 1972

[54] TAPERED SEPARATOR FOR PLEATED FILTER

[72] Inventor: Donald E. Engleman, Louisville, Ky.

[73] Assignee: American Air Filter Company, Inc., Louisville, Ky.

[22] Filed: May 20, 1971

[21] Appl. No.: 145,332

Related U.S. Application Data

[60] Continuation-in-part of Ser. No. 882,385, Dec. 5, 1969, abandoned, which is a division of Ser. No. 757,841, Sept. 6, 1968, Pat. No. 3,541,829.

[52] U.S. Cl. ..................................55/500, 55/521
[51] Int. Cl. ............................................B01d 27/06
[58] Field of Search .................55/500, 521; 210/493

[56] References Cited

UNITED STATES PATENTS

| | | |
|---|---|---|
| 3,242,656 | 3/1966 | Murphy, Jr. ...............55/500 |
| 3,293,833 | 12/1966 | Barany .....................55/500 |

*Primary Examiner*—Bernard Nozick
*Attorney*—Ralph B. Brick and Charles G. Lamb

[57] ABSTRACT

A tapered separator for a pleated filter formed from a blank of foldable sheet material having one portion folded in zigzag formation to present first fold increments of a first selected height and the remaining portion folded in zigzag fashion to present second fold increments in substantially end-to-end relation with said first fold increments and of a second selected height different from the height of said first fold increments to thereby provide a tapered configuration to the separator.

2 Claims, 6 Drawing Figures

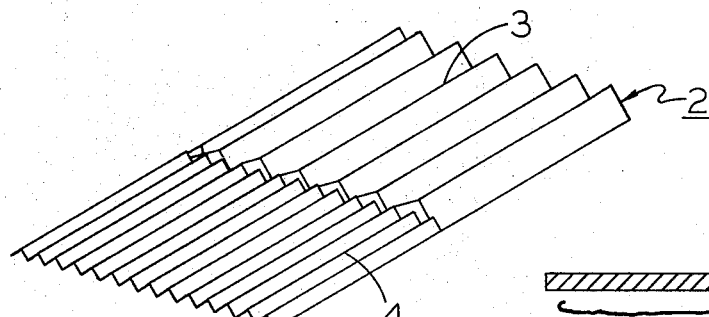
FIG. 1
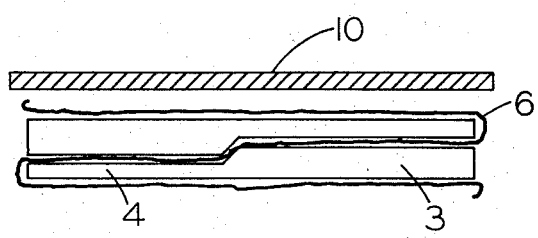
FIG. 2
FIG. 4
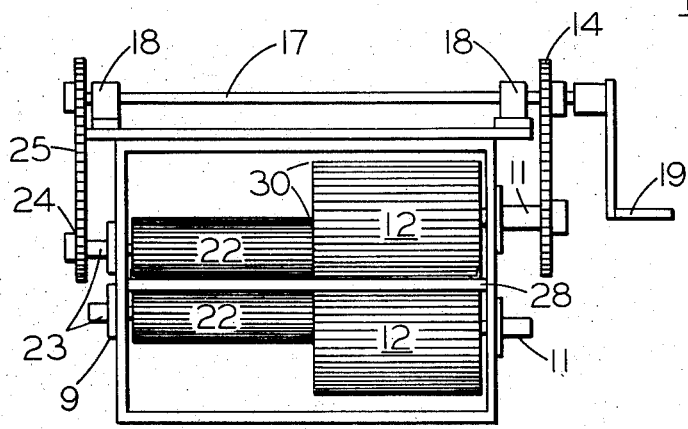
FIG. 3
FIG. 6
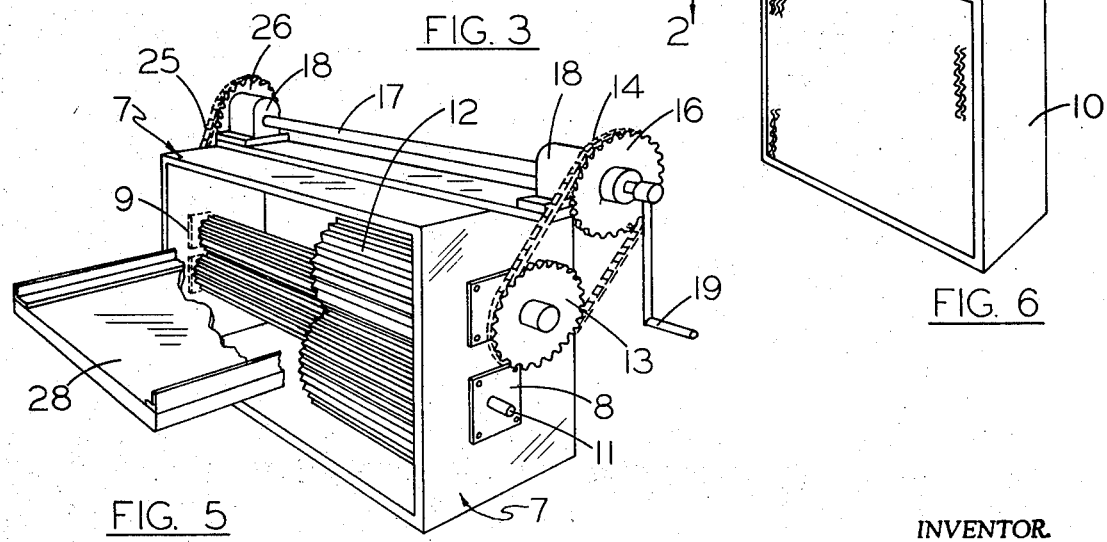
FIG. 5
INVENTOR.
DONALD E. ENGLEMAN
BY
Ralph C. Brick

3,696,592

TAPERED SEPARATOR FOR PLEATED FILTER

BACKGROUND OF THE INVENTION

The present invention relates to pleated filter construction, and more particularly, to a tapered separator for separating pleat walls of a pleated filter. This application is a continuation-in-part of application Ser. No. 882,385, filed Dec. 5, 1969 now abandoned, which is a division of application Ser. No. 757,841, filed Sept. 6, 1968, now U.S. Pat. No. 3,541,829.

In the art of fluid filtration, it is known to extend filter material back and forth in pleated formation across a material being held in spaced relationship from each other by spacer members. Various types of spacer members have been utilized in the past to accomplish the spacing of the pleat walls. Many of these types of spacer members have been useful only in limited environments where the pleats have been of a certain shape and have been of limited depth. Other spacers have required costly materials, costly and complex manufacturing equipment, and have been complex and expensive to construct and assemble, requiring multiple steps in construction.

The present invention provides a new, useful and unobvious tapered spacer member which avoids the disadvantages of past constructions, the spacer member of the present invention permitting efficient and economical mass production, and at the same time, being adaptable to varying size and configuration demands.

Various other features of the present invention will become obvious to one skilled in the art upon reading the disclosure set forth herein.

More particularly, the present invention provides a filter apparatus comprising a flowthrough housing; a sheet of filter material disposed within the housing in sealed relationship with the sides of the housing, the sheet being folded back and forth upon itself to provide a plurality of pleats extending across the gas stream to be treated; and, tapered separators disposed between the pleats, at least one of the separators including a blank of foldable sheet material having an upstream portion thereof folded in preselected zigzag formation to provide a plurality of first folds of a first selected height, the blank having the remaining downstream portion folded in preselected zigzag formation to provide a plurality of second folds of a second selected height different from the height of the first folds to provide a separator of tapered configuration, the first and second folds being substantially parallel to enhance laminar flow within the filter apparatus.

It is to be understood that various changes can be made in the arrangement, form and construction of the apparatus set forth herein without departing from the scope or spirit of the present invention.

Referring to the drawing which discloses one advantageous embodiment of the present invention:

FIG. 1 is an isometric view disclosing a novel tapered separator of the present invention;

FIG. 2 is an enlarged partial elevational view taken a plane through 2—2 of FIG. 6 disclosing a portion of the filter housing and the tapered separator of FIG. 1 in engagement with a sheet of filter material folded back and forth upon itself;

FIG. 3 is a front elevational view of one embodiment of the novel forming apparatus to make the tapered separator of the present invention;

FIG. 4 is a schematic side view of the end-to-end pairs of rolls of FIG. 3, illustrating that the pitch planes of such roll pairs are in common;

FIG. 5 is an isometric elevational view of the apparatus of FIG. 3; and,

FIG. 6 is a perspective view of a filter apparatus which incorporates the novel separator of the present invention.

Referring to FIG. 1 of the drawings, the novel tapered separator of the present invention is disclosed. This support member can be formed from blank 2 of suitable foldable sheet material having a quality and thickness which permits it to hold the shape into which it is folded. Any one of a number of known materials can be utilized for the spacer members, and advantageously, a good quality aluminum sheet can be employed. Blank 2 is sized in accordance with the particular size and shape of the pleated unit filter assembly in which it is to be employed. The blank includes one portion thereof folded in preselected zigzag formation to provide a plurality of fold increments 3 of a first selected height. The remaining portion of the blank is folded in preselected zigzag formation to provide a plurality of fold increments 4 of a second selected heights, fold increments 4 being in substantial end-to-end relation with fold increments 3 and parallel thereto. It is to be noted that the height of fold increments 4 are different from the height of fold increments 3, the separator thus taking on a tapered configuration. This is more readily apparent from FIGS. 2 and 6 of the drawing which discloses such novel separators in assembly engagement with a sheet of filter material 6 folded back and forth upon itself in pleated formation, the resulting filter assembly being disposed in a filter housing which is disclosed as a rectangular flow-through frame 10. Frame 10 can be formed from any one of several suitable materials such as metal, wood or a chipboard material. With the edges of the filter assembly glued and sealed to the walls of the frame in a manner known in the art, the assembly serves to be utilized across a fluid stream to be treated, the pleats of material being held in spaced relation by the novel spacer members as will be obvious from FIG. 2.

To fold blanks 2 in an efficient and economical manner, a novel apparatus such as that disclosed in U.S. Pat. No. 3,541,829, and in FIG. 3 of the drawing can be utilized. This apparatus includes open-ended rectangular housing frame 7 having a spaced pair of bearing blocks 8 supported in one side wall thereof, and a spaced pair of bearing blocks 9 supported in the opposite side wall thereof. Suitable roll support pins 11 are rotatably journaled in bearing blocks 8 to extend within housing 7 in cantilever fashion. Roll pins 11 serve to support a pair of similar fluted rolls 12 thereon, the flutes of the rolls of the roll pair meshing in geared relationship. The upper roll of roll pair 12 is driven through gear 13 fixed to an end of roll pin 11 projecting outside housing 7. Gear 13, in turn, is connected by endless chain 14 to drive gear 16 mounted on drive shaft 17. Shaft 17 is supported on bearing blocks 18 which are, in turn, mounted on housing 7. Shaft 17 can be rotated by crank arm 19 connected at one end thereof. It will be obvious that when crank arm 19 is rotated, drive gear 16 is caused to rotate. This, in turn, rotates gear 13 and thus meshed roll pair 12, the lower roll of roll pair 12 being mounted on its roll support pin 11 in idle fashion from bearing block 8.

As will be obvious from FIGS. 3 to 5 of the drawing, a second pair of fluted similar rolls 22 are provided in housing 7. Rolls 22 are supported on suitable roll support pins 23 (FIG. 3) which extend in cantilever fashion from bearing blocks 9. As with roll pin 12, the flutes of upper roll 22 mesh in gear like fashion with the flutes of the lower roll, the lower roll being mounted on its pin in idle fashion. The upper roll pin 23 has a driven gear 24 thereon which is, in turn, connected through endless chain 25 to gear 26 mounted on drive shaft 17. It is to be noted that the roll pairs 12 and 22 in the embodiment of FIG. 3 are in adjacent end-to-end relation, and that the pitch plane — that is, the plane perpendicular to the axial plane and tangent to the pitch surfaces of a roll pair— of one roll pair is in common with the pitch plane of the other roll pair, attention being directed to X—X of FIG. 4.

As can be seen in FIG. 5, a suitable guide and feed table 28 is mounted on housing 7, the surface of this feed table being in alignment with the common pitch plane of the first and second fluted roll pairs so that a blank of meterial can be fed simultaneously between the two pairs of rolls without bending. In accordance with one novel feature of the present invention, the roll pairs 12 and 22 are so arranged that the diameters of the rolls of one pair differ from the diameter of the rolls of the other roll pair, but the distance around the periphery of a roll of roll pair 12, including the peripheral distance along the flutes of such roll times the gear ratio of the drive to the driven gear for such roll pair is substantially equal to the distance around the periphery of a roll of the other roll paid including the peripheral distance along the flutes of the other roll pair times the gear ratio of the drive to the driven gear for such roll pair. Accordingly, the same amount of distance is covered by each roll pair on the blank in same unit time as it is fed simultaneously through both roll pairs. In accordance with still another novel feature of the present invention, the flutes of one roll pair are so related to the depth and number of flutes of the other roll pair that the folds in one portion of the blank as formed by one roll pair are equal multiples of the folds in the other portion of the blank as formed by the rolls of the other roll pair. In addition, it is to be noted that adjacent ends of the flute crests of adjacent roll pairs advantageously can be rounded as at 30 to reduce the possibilities of binding.

It is to be understood that the present invention is not to be considered as limited to be manufactured by the embodiment of the apparatus disclosed in FIGS. 3 and 5. For example, it is possible to provide an apparatus wherein a first pair of fluted rolls are sized along their rotating axis to fold substantially an entire blank of foldable sheet material to a first predetermined depth and a second pair of rolls are provided sized to fold at least a portion of the fold blank to a second predetermined depth different from the first depth. Advantageously, the second pair of rolls would be sized to refold at least a portion of the foldable blank to a second predetermined depth larger than the first depth. It is to be understood that in such arrangement, it would be necessary to have the different roll pairs in successive relationship rather than in end-to-end relationship.

What is claimed is:

1. A filter apparatus comprising a flow-through housing: a sheet of filter material disposed within said housing in sealed relation with the sides of said housing and folded back and forth upon itself to provide a plurality of pleats extending across said housing and, a plurality of tapered separators each disposed within a said pleat, said separators each including a blank of foldable sheet material having a first portion thereof folded in a zigzag formation to provide a plurality of first folds extending perpendicularly to said pleats and being uniformly of a first selected height; said blank having the remaining downstream portion thereof folded in pre-selected zigzag formation to provide a plurality of second folds extending perpendicularly to said pleats and being uniformly of a second selected height different from said first height said first and second folds including edges and being separated by a step portion to provide a separator of tapered configuration, the first and second fold edges being parallel to enhance laminar flow within the apparatus and adjacent pleats alternately having the first and second folds as the upstream portion.

2. The apparatus of claim 1, said fold increments of one portion of said blank being an even multiple of the fold increments of the other portion of said blank.

* * * * *